Nov. 5, 1935.　　　　L. G. COPEMAN　　　　2,020,256
PROTECTIVE COATINGS AND PROCESS OF APPLYING AND REMOVING
Filed March 5, 1932　　　3 Sheets-Sheet 1
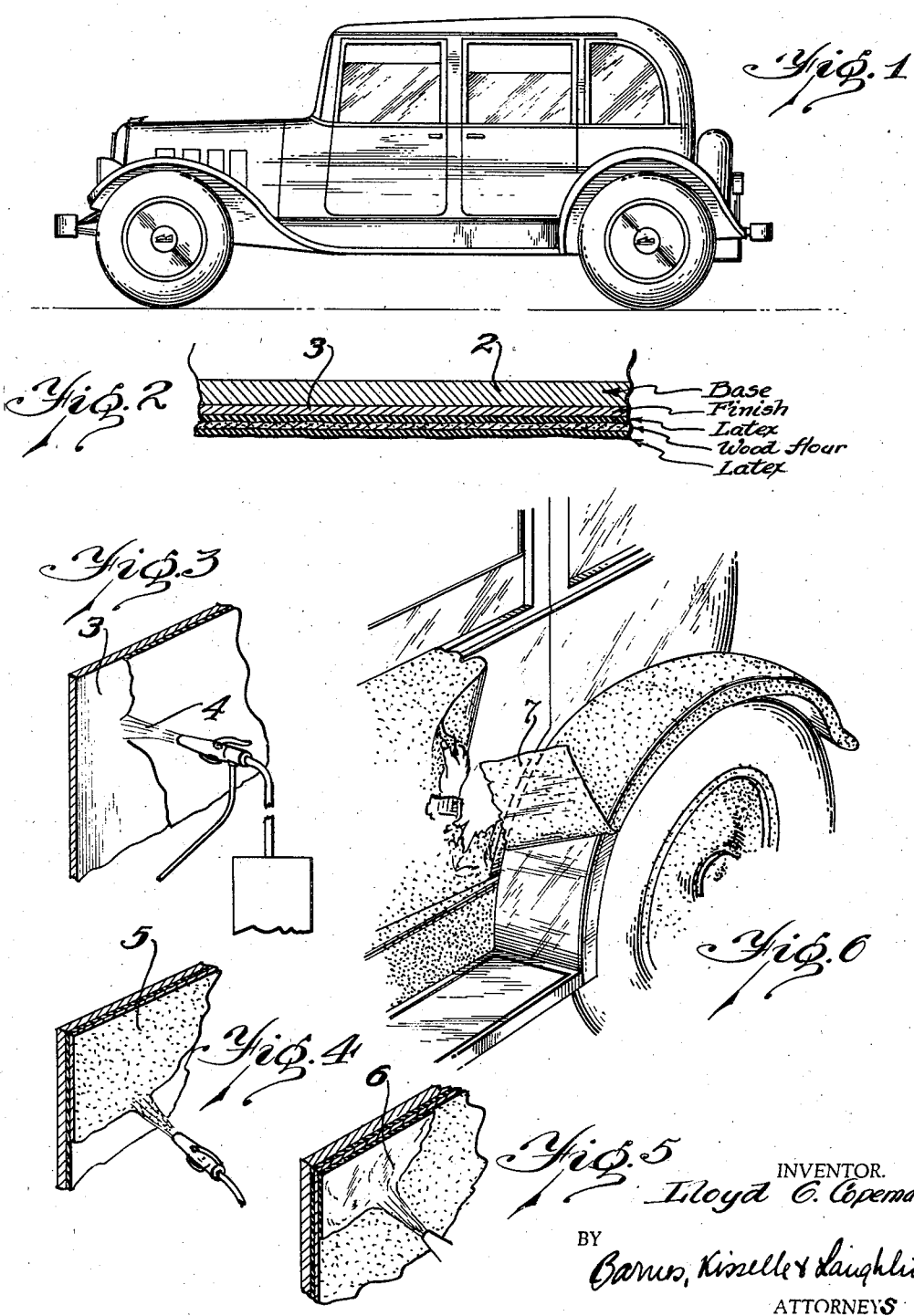

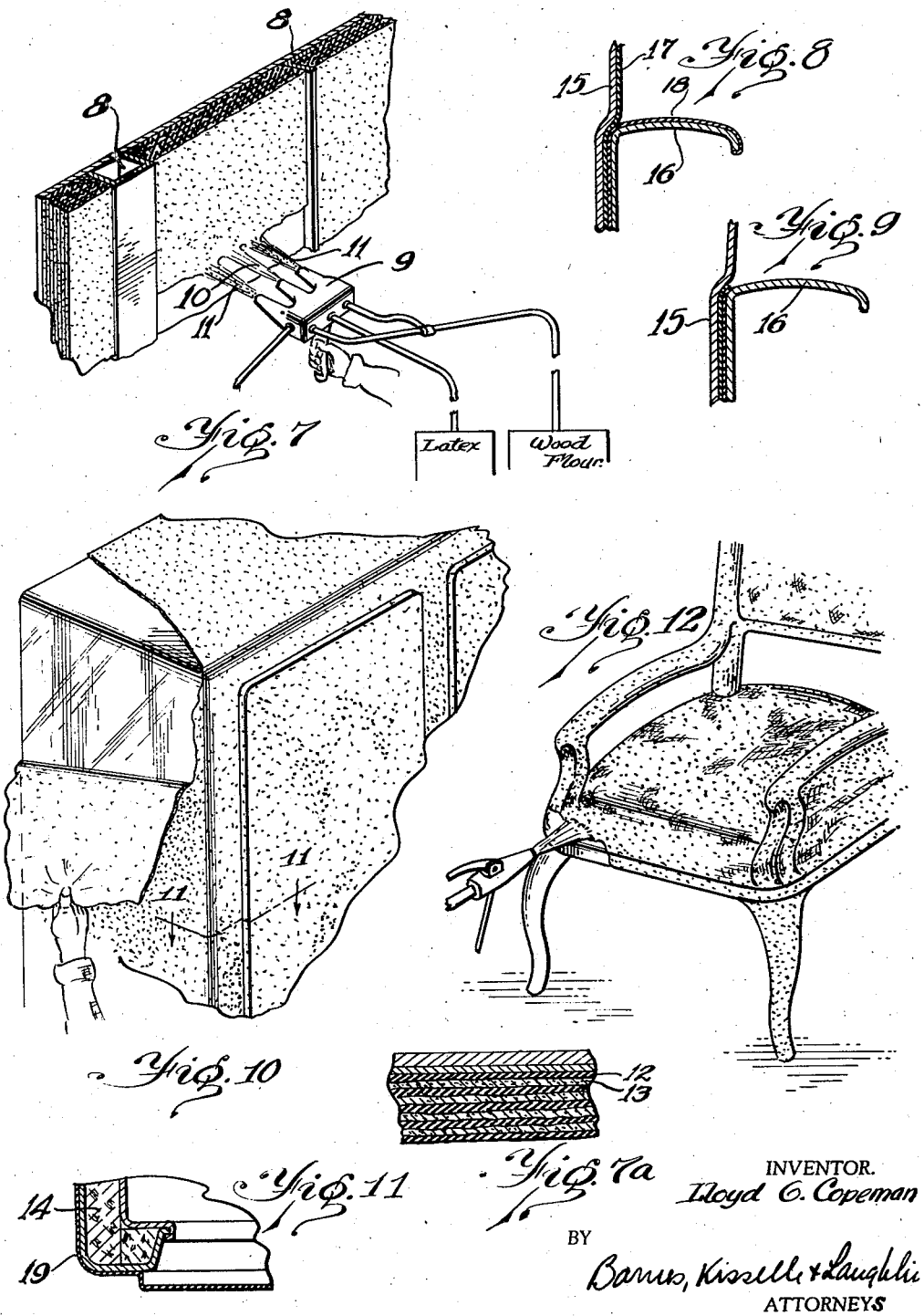

Nov. 5, 1935.  L. G. COPEMAN  2,020,256
PROTECTIVE COATINGS AND PROCESS OF APPLYING AND REMOVING
Filed March 5, 1932  3 Sheets-Sheet 3
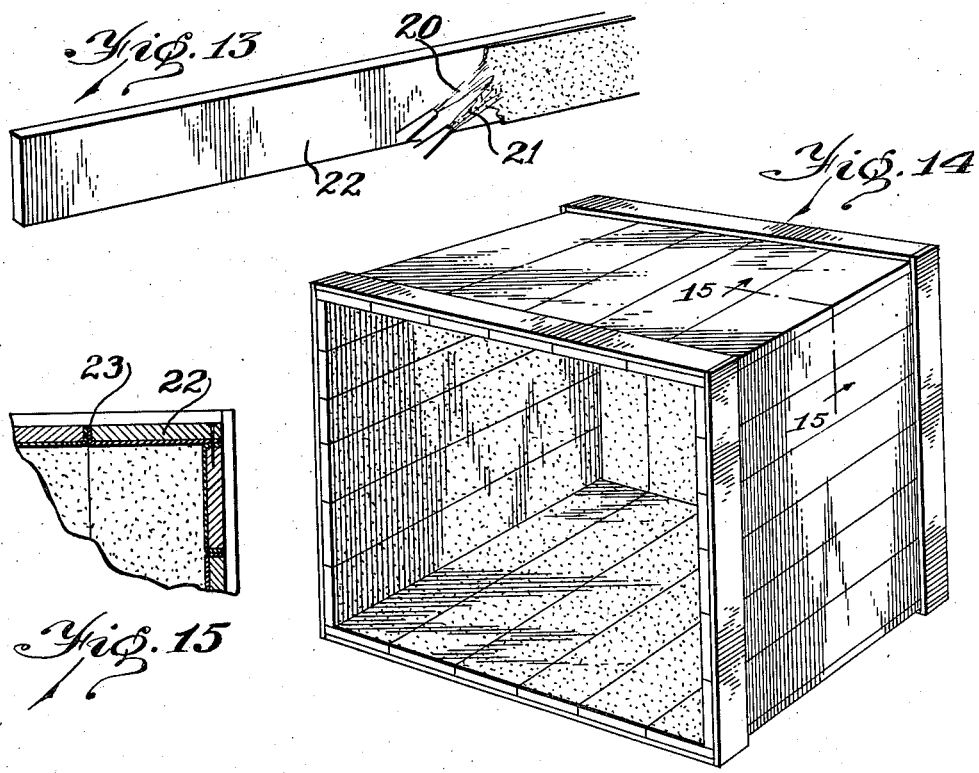
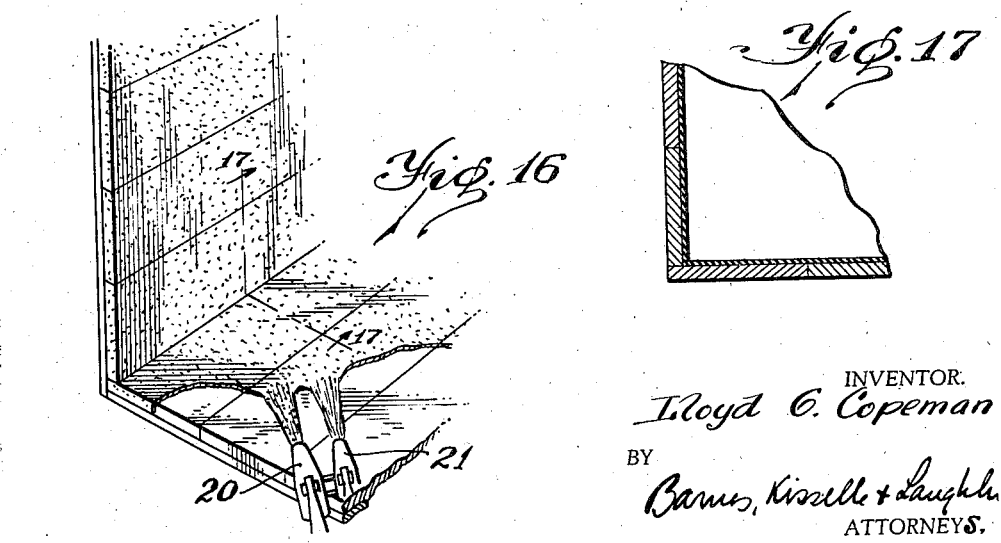
INVENTOR.
Lloyd G. Copeman
BY
Barnes, Kisselle & Laughlin
ATTORNEYS.

Patented Nov. 5, 1935

2,020,256

UNITED STATES PATENT OFFICE 2,020,256

PROTECTIVE COATINGS AND PROCESS OF APPLYING AND REMOVING

Lloyd G. Copeman, Flint, Mich., assignor to Copeman Laboratories Company, Flint, Mich., a corporation of Michigan Application March 5, 1932, Serial No. 597,013

17 Claims. (Cl. 91—68)

This invention relates to protective coatings and process of applying and removing, and has to do particularly with permanent or temporary coatings adapted to be applied directly to and conforming with the shape of the article coated.

In my prior application Serial No. 593,279 I have disclosed the idea of a temporary coating made up of a plurality of layers of a material plastically applied and allowed to set, said number of layers being sufficient to permit stripping off of the applied material in relatively large sheets. I have discovered that when using solutions such as latex or other aqueous dispersions of rubber, that the time and expense required in applying the plurality of layers can be materially reduced by combining a filler with the applied material or applying a filler while the base material is still in a more or less plastic condition.

One of the objects of the present invention is to apply an aqueous dispersion of rubber, such as latex or any other solution containing a solvent which will set up in the form of a coating, and before this initially applied coating is completely set to apply a dry aggregate thereto. The application of this aggregate will greatly accelerate the setting up of the original coating and will serve as a backing for the originally applied coating to enable the same to be easily peeled off. A second coating of latex or similar material may then be applied on top of the dry aggregate to coat the same for protection against the weather and to build up an additional thickness of backing.

Other features of the invention embody the steps of applying the solution of plastic material and the aggregate simultaneously or independently depending upon the desired degree of removability of the finished coating.

Other features embody the manner of mixing the coating materials, the steps and manner of application, and the particular manner in which different articles are coated.

In the drawings:

Fig. 1 illustrates one embodiment of the invention wherein an automobile is completely coated except for the windows.

Fig. 2 is an enlarged fragmentary section illustrating two base coats of latex and the like and one coat of filler.

Figs. 3, 4 and 5 illustrate successive steps of obtaining the coating illustrated in Fig. 2, wherein the liquid solution is directly applied to the surface, next covered with a dry aggregate and then this dry aggregate finally covered by another layer of the liquid solution.

Fig. 6 illustrates the manner of stripping off the built up coating in large sheets.

Fig. 7 is a modification wherein the dry aggregate and liquid or plastic solution is applied at the same time and from the same gun.

Fig. 7a is a sectional view illustrating the manner of building up discrete layers of a base material such as latex and a filler to form permanent insulation and the like.

Figs. 8 and 9 illustrate the assembly of two separately coated articles according to the present process wherein a portion of the coating is a temporary one and is removable as shown in Fig. 9, and the remainder of the coating permanently positioned between the two articles.

Fig. 10 illustrates the manner of completely coating refrigerator boxes and of tearing the coating therefrom.

Fig. 11 is a section taken on line 11—11 of Fig. 10 illustrating the application of a temporary coating to the exterior and the use of the same material in building up insulation on the inside of the box.

Fig. 12 illustrates the method of applying my novel coating to furniture.

Fig. 13 illustrates one step in building up a box for shipping articles wherein the liquid or plastic material and aggregate are applied to the individual boards before assembly.

Fig. 14 illustrates the completely assembled and interior coated packing box.

Fig. 15 is a section taken on line 15—15 of Fig. 14.

Fig. 16 illustrates a further modification wherein the liquid or plastic solution and a dry aggregate are applied to the interior of the packing box.

Fig. 17 is a section taken on line 17—17 of Fig. 16.

The present invention, in the mean, embodies the application of what might be considered two different types of coatings, both of which are adapted to be applied and built up in a minimum amount of time, but one of which is adapted to be a temporary coating in that it is intended to be peeled off whenever desired, and the other of which is more or less permanent.

The first type of coating is particularly adapted to be applied to factory finished surfaces, that is, to automobiles, furniture, refrigerator boxes, and the like. The coating materials used may vary considerably, but in most cases I preferably use a coating material which is held in solution by a solvent or any other suitable carrying agent. This solution may be any of the various lacquers

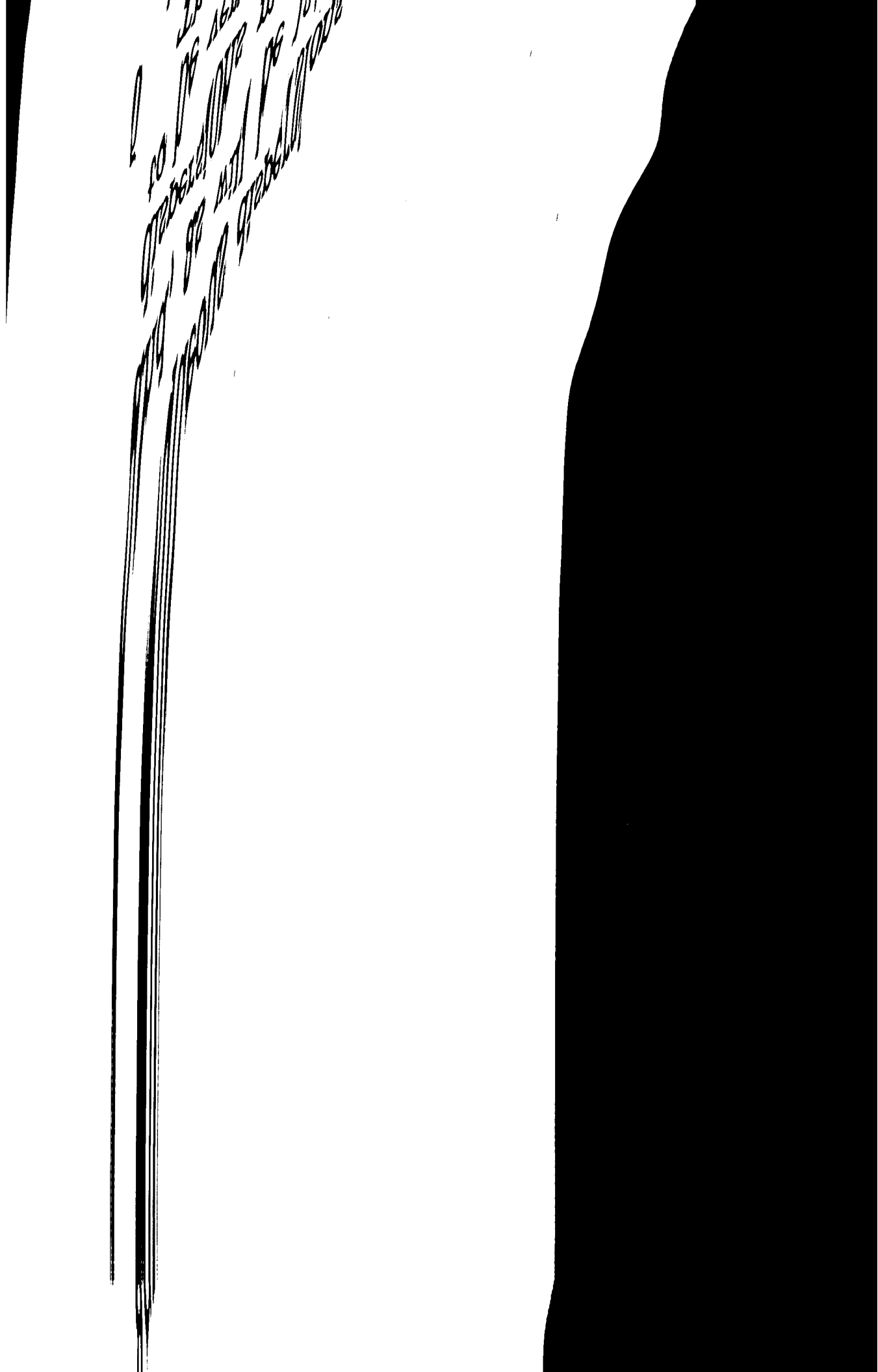

basic coating material and dry aggregate, either combined or separately, threads of the cloth having been treated as described in the Tully patent, the coating material such as latex will be prevented from bonding with the cloth and may thus be very easily stripped off when desired. It is possible with most fabrics to coat them directly according to the present process, the dry aggregate having sufficient bonding action with the basic coating material as to cause such coating to be easily peeled off.

It will be found desirable to coat the inside of packing containers and in this case the use of a dry aggregate is more for the purpose of building up a thick but cheap coating rather than for ease in removing the coating, and in Fig. 13 I have shown the application of a basic coating material 20 and an aggregate 21 to one side of a board 22 preparatory to building the container which is shown in Fig. 14. In this case where the individual boards have been initially coated, a very tight container is obtained because the joints 23 are sealed with the elastic coating so as to render the container substantially waterproof even though coated only on the inside. In Fig. 16 I have illustrated a process of applying the basic coating and dry aggregate directly to the interior surfaces of the finished container. The application of the coating is not so easy in this case as where it is applied directly to the individual boards and the coating is more likely to be accidentally peeled off during shipment of the container, particularly if any of the objects in the container are loose. If the coating remains intact in the container shown in Fig. 16 it will, of course, form a substantially air tight compartment because of the continuous lining, as is clearly illustrated in Fig. 17.

It will be understood that in applying my novel coating to surfaces adapted to be insulated or sound proofed, I may use some other adhesive than the basic coating material as the initial coating. Such adhesive may be Vulcalock or other rubber adhesives and in this case the aqueous dispersion of rubber or flexible lacquer coating may be directly applied to the Vulcalock or other adhesive and then wood flour or other aggregate and then the coating of rubber, lacquer or the like.

What I claim is:

1. In the art of temporarily protecting articles during shipment, handling, storage, and the like, the process of applying and building up a temporary readily peelable protective coating for relatively non-porous surfaces of said articles, which comprises, applying a coating substance carried by a liquid vehicle, backing said substance while plastic with a separate coating of a dry, inert, cushioning material selected from the group which consists of paper, wood flour, ground rubber, cotton dust, plaster of Paris and cereal flours, setting up the plastically applied coating into a homogeneous non-tack flexible coating, said plastically applied coating and inert material being bonded together and the said inert material being added in sufficient body to cause said complete coating to readily strip off the relatively non-porous surface in large sheets.

2. In the art of protecting relatively non-porous surfaces of articles during shipment, handling, storage and the like, the process of forming a readily peelable protective coating for said relatively non-porous surfaces, which comprises applying a coating substance carried by a liquid vehicle to said surfaces, backing said substance while plastic with a coating of liquid absorbent substance selected from the group which consists of paper, wood flour, ground rubber, cotton dust, plaster of Paris and cereal flours, applying said substance in sufficient amount to accelerate the evaporating of the liquid vehicle and depositing of the coating substance, the backing substance and plastically applied coating bonding together and setting as a non-tacky flexible coating, said backing substance being added in sufficient amount to cause the complete coating to peel off in relatively large sheets, and then peeling off said flexible coating to expose the temporarily protected surface.

3. In the art of temporarily protecting articles during shipping, handling, storage, and the like, the process of forming a temporary readily peelable protective coating for the relatively non-porous surfaces of said articles, which comprises applying a coating substance carried by a liquid vehicle as a thin layer to the surface to be protected, backing said thin layer while still plastic with an inert building up material selected from the group which consists of paper, wood flour, ground rubber, cotton dust, plaster of Paris and cereal flours, setting up the coating substance into a thin homogeneous non-tacky coating and bonding said backing material to said coating, said backing material being added in sufficient body to protect and cushion said surfaces and thin coating against bumps and external marring actions.

4. In the art of temporarily protecting articles during shipping, handling, storage, and the like, the process of forming a temporary readily peelable protective coating for the relatively non-porous surfaces of said articles, which comprises applying a coating substance carried by a liquid vehicle to the surface to be protected, backing said layer after application to said surface and while still plastic with ground rubber, setting up the coating substance into a homogeneous non-tacky coating and bonding said backing material to said coating, said backing material being added in sufficient body to protect and cushion said surfaces and coating against bumps and external marring actions.

5. In the art of temporarily protecting articles during shipping, handling, storage, and the like, the process of forming a temporary readily peelable protective coating for the relatively non-porous surfaces of said articles, which comprises applying temporary coating substances including a coating substance carried by a liquid vehicle and adapted to set up into a flexible, homogeneous, substantially non-tacky coating and a coating substance of relatively inert building up material selected from the group which consists of paper, wood flour, ground rubber, cotton dust, plaster of Paris and cereal flours, and adapted to absorb liquid from and accelerate the setting up of the coating substance carried by the liquid vehicle, said inert material bonding to the plastic coating substance when set up and forming a complete flexible coating, said inert material being added in sufficient body to make the complete bonded coating readily removable from the relatively non-porous surface in large sheets.

6. In the art of temporarily protecting articles during shipping, handling, storage and the like, the process of forming a temporary readily peelable protective coating for the relatively non-porous surfaces of said articles, which comprises applying temporary coating substances including an aqueous dispersion of rubber and a coating of dry, relatively inert, cheap building up material selected from the group which consists of paper, wood flour, ground rubber, cotton dust, plaster of Paris and cereal flours, depositing the rubber from said aqueous dispersion, said building up material being bonded to the rubber coating during the setting up step to form a flexible coating, said building up material being added in sufficient amount to protect and cushion the relatively non-porous surface against bumps and external marring and also of sufficient body as to make the entire coating readily peelable in large sheets from said non-porous surfaces.

7. In the art of temporarily protecting articles during shipping, handling, storage, and the like, the process of forming a protective readily peelable temporary coating for relatively non-porous surfaces of said articles, which comprises applying an aqueous dispersion of rubber to the surface to be protected, backing said aqueous dispersion with a separate coating of dry, substantially inert, building up material selected from the group which consists of paper, wood flour, ground rubber, cotton dust, plaster of Paris and cereal flours, setting up the aqueous dispersion of rubber, and bonding said building up material to the deposited rubber, said building up material being of sufficient mass as to render the entire coating readily peelable in large sheets from the temporary protected surface and to protect and cushion said surfaces and coating rubber against bumps and external marring actions.

8. In the art of temporarily protecting articles during shipping, handling, storage, and the like, the process of forming a protective readily peelable temporary coating for relatively non-porous surfaces of said articles, which comprises applying temporary coating substances including an aqueous dispersion of rubber and a coating of dry, relatively inert, cheap building up material selected from the group which consists of paper, wood flour, ground rubber, cotton dust, plaster of Paris and cereal flours in sufficient amount to accelerate the depositing of rubber as a homogeneous flexible coating, said coating materials being inherently bonded together and said building up material being of sufficient body as to temporarily protect and cushion the relatively non-porous surfaces against bumps and external marring and also being of sufficient body as to enable the complete coating to readily strip from the protected surface.

9. As a new article of manufacture, a factory finished and sealed product having a relatively non-porous surface and a temporary protective coating therefor comprising a thin homogeneous, flexible inner coating of non-tacky material, and one or more coatings of flexible inert backing material selected from the group which consists of paper, wood flour, ground rubber, cotton dust, plaster of Paris and cereal flours bonded to said first coating, said first coating being of a material which will be readily removable from the factory finished surface, and said bonded coating or coatings of backing material presenting sufficient body as to effect removal of the entire coating in relatively large sheets.

10. As a new article of manufacture, a factory finished and sealed product having a relatively non-porous surface and a temporary protective covering therefor to protect the non-porous surface during shipping, handling, storage and the like, comprising a thin homogeneous flexible inner coating of thin non-tacky rubber deposited from an aqueous dispersion of rubber, and one or more coatings of flexible relatively inert backing material selected from the group which consists of paper, wood flour, ground rubber, cotton dust, plaster of Paris and cereal flours bonded to said first thin coating of rubber, said backing material being of sufficient thickness as to protect the thin rubber coating and non-porous surface against bumps and external marring actions and also of sufficient body as to effect removal of the entire coating in relatively large sheets.

11. In the art of temporarily protecting articles during shipping, handling, storage, and the like, the process of forming a temporary readily peelable protective coating for the relatively non-porous surfaces of said articles, which comprises applying a coating substance carried by a liquid vehicle to the surface to be protected, backing said layer after application to said surface and while still plastic with wood flour, setting up the coating substance into a homogeneous non-tacky coating and bonding said backing material to said coating, said backing material being added in sufficient body to protect and cushion said surfaces and coating against bumps and external marring actions.

12. In the art of temporarily protecting articles during shipping, handling, storage, and the like, the process of forming a temporary readily peelable protective coating for the relatively non-porous surfaces of said articles, which comprises applying a coating substance carried by a liquid vehicle to the surface to be protected, backing said layer after application to said surface and while still plastic with cotton dust, setting up the coating substance into a homogeneous non-tacky coating and bonding said backing material to said coating, said backing material being added in sufficient body to protect and cushion said surfaces and coating against bumps and external marring actions.

13. In the art of temporarily protecting articles during shipping, handling, storage and the like, the process of forming a temporary readily peelable protective coating for the relatively non-porous surfaces of said articles, which comprises applying temporary coating substances including an aqueous dispersion of rubber and a coating of liquid absorbent, relatively inert, cheap building up material, depositing the rubber from said aqueous dispersion, said building up material being bonded to the rubber coating during the setting up step to form a flexible coating, said building up material being added in sufficient amount to protect and cushion the relatively non-porous surfaces against bumps and external marring and also of sufficient body as to make the entire coating readily peelable from said non-porous surfaces.

14. As a new product, an article of manufacture having a finished non-porous surface provided with a temporary coating for protection during shipping, handling, storage and the like comprising a readily peelable dried covering of the solids of an aqueous dispersion of rubber, said covering containing wood flour.

15. As a new product, an article of manufacture having a finished non-porous surface provided with a temporary coating for protection during shipping, handling, storage and the like comprising a readily peelable dried covering of the solids of an aqueous dispersion of rubber, said covering containing ground rubber.

16. In the art of temporarily protecting articles during shipping, handling, storage and the like, the process of forming a temporary readily peelable protective coating for the relatively non-porous surfaces of said articles, which comprises applying temporary coating substances including one coating substance carried by a liquid vehicle and adapted to set up into a flexible, homogeneous, substantially non-tacky coating contacting with said relatively non-porous surfaces, and a second coating substance of liquid absorbent, relatively inert, cheap building up material adapted to absorb liquid from and accelerate the setting up of the coating substance carried by the liquid vehicle, depositing the coating substance from the liquid vehicle, said outer coating of building up material being bonded to the inner coating during the setting up step to form a flexible coating, said building up material being added in sufficient amount to protect and cushion the first coating and the relatively non-porous surfaces against bumps and external marring and also in sufficient body as to make the entire body readily peelable from said non-porous surfaces.

17. As a new article of manufacture, a factory finished and sealed product having a relatively non-porous surface and a temporary protective covering therefor to protect the non-porous surface during shipping, handling, storage and the like, comprising a thin homogeneous flexible inner coating of thin non-tacky rubber deposited from an aqueous dispersion of rubber, and one or more coatings of liquid absorbent, relatively inert cheap backing material, said backing material being of sufficient thickness as to protect the thin rubber coating and non-porous surface against bumps and external marring actions and also of sufficient body as to effect removal of the entire coating in relatively large sheets.

LLOYD G. COPEMAN.